United States Patent [19]
Calloway et al.

[11] Patent Number: 4,947,186
[45] Date of Patent: Aug. 7, 1990

[54] APPARATUS AND METHOD FOR A UV LASER IMAGE RECORDER

[75] Inventors: Ancel R. Calloway, Huntington Beach; Jay H. Berman, San Pedro, both of Calif.

[73] Assignee: The Aerospace Corporation, El Segundo, Calif.

[21] Appl. No.: 247,787

[22] Filed: Sep. 22, 1988

[51] Int. Cl.$^5$ .................... G01D 9/00; G01D 15/14; H03F 7/00
[52] U.S. Cl. ................................. 346/1.1; 346/108; 346/110 R; 307/422
[58] Field of Search ............... 346/108, 107 R, 76 L, 346/110, 1.1; 307/427

[56] References Cited

U.S. PATENT DOCUMENTS 3,934,154  1/1976  Cook, Jr. ........................ 307/427

Primary Examiner—Mark J. Reinhart
Attorney, Agent, or Firm—William J. Burke

[57] ABSTRACT

An ultraviolet (UV) laser image recorder, consisting of an argon laser operating in the ultraviolet, with frequency doubling, records on a processless electron recording medium (PERM) and can develop either red or blue coloration in PERM.

2 Claims, 2 Drawing Sheets

APPARATUS AND METHOD FOR A UV LASER IMAGE RECORDER

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

This invention relates to a method and apparatus for developing a processless electron recording medium (PERM) using an ultraviolet laser beam.

2. Description of the Prior Art

PERM is a laminated transparent film consisting of an electron sensitive layer that is adhered to a transparent conductive layer on a polyester base. It was developed by the GAF Corporation as a processless electron recording medium that can be used for extremely high resolution image production. Recording is accomplished by a modulated and rastered electron beam (e-beam).

A prior art e-beam system used to record on PERM is illustrated in FIG. 1. The essential components include a triple-differentially-pumped vacuum chamber, an electron gun, electromagnetic focusing and deflecting coils, and a film transport system. An electronic signal is input to an electron gun 2 that is maintained in a $10^{-7}$ Torr high vacuum environment by a stage one vacuum system 4. A beam of electrons that pass through an orifice from stage one is focused by electromagnetic coils 6 into the deflection yoke 8 where it is electromagnetically rastered onto the surface of PERM. The focusing and rastering is carried out in a $10^{-5}$ Torr vacuum by the stage two vacuum system 10. A mechanical scroll 12 transports the PERM 14 in a third vacuum chamber that is maintained at 0.1 Torr by the stage three vacuum system 16.

There are several disadvantages to the use of this method and apparatus. First, the e-beam development of PERM is complex. The system shown in FIG. 1 requires a triple-differentially-pumped vacuum using diffusion pumps and cryogenic traps. In addition to its complexity, the e-beam process requires the addition of a costly transparent conductive layer to the PERM film to dissipate electric charge. This increases the cost of producing PERM more than 25 percent. Finally, the e-beam system is capable of producing only blue coloration in PERM.

It is therefore an object of the present invention to develop a less complex process that is free of vacuum constraints for recording on PERM.

It is also an object of the present invention to develop a PERM recording process that is competitive with the speed with which electron beams record on PERM.

It is yet another object of the present invention to make possible a PERM developing process that can record in either red or blue coloration.

Summary of the Invention

Pulses from an argon laser beam are selectively dimmed, frequency doubled into the ultraviolet, focused and rastered across the surface of a processless electron recording medium (PERM) at a rate that is competitive with the prior system of electron beam development. The invention uses less expensive PERM film and does not require the complex vacuum system currently used in electron beam recorders. In addition, both red and blue coloration can be developed in PERM by the selection of exposure wavelengths that are produced by the laser and its ancillary equipment.

DETAILED DESCRIPTION OF THE PREFERRED EMBODIMENT

Figure 1:
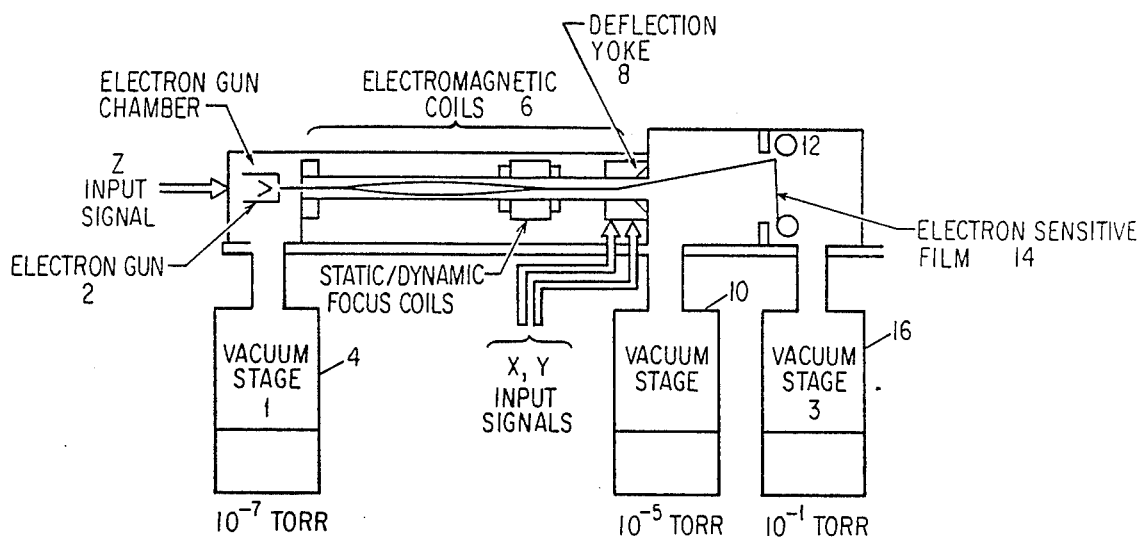
FIG. 1 is a schematic of a prior art electron beam recorder for developing PERM.
Figure 2:
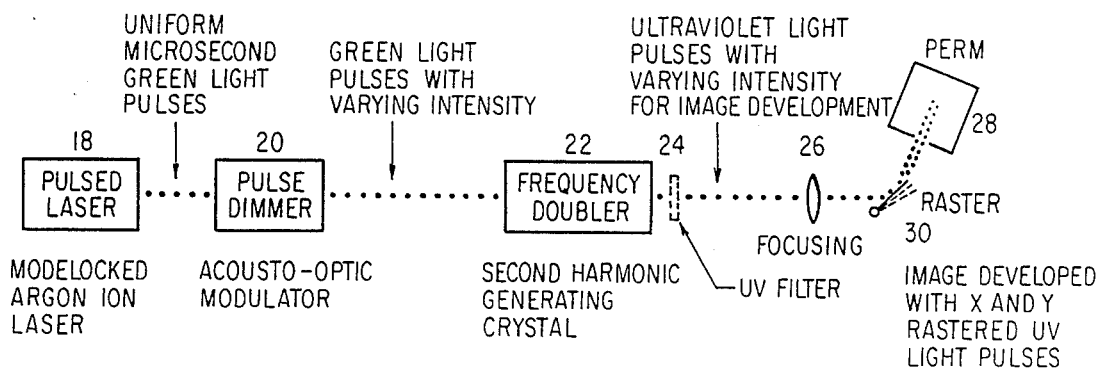
FIG. 2 is a flow diagram illustrating the method of a UV Laser Image Recorder.

The method for using a UV laser as an image recorder is shown in FIG. 2. Argon ion laser pulses are selectively dimmed and frequency doubled into the ultraviolet. These UV light pulses are then focused and rastered across the PERM surface for image development. The UV output of a modelocked argon ion laser 18 is passed through an acousto-optic modulator 20, a second harmonic generator (frequency doubler) 22 and a focusing lens 26 to the surface of the PERM 28 via a raster 30. For certain applications, a filter 24 is used to filter out the 514 nm light that was not frequency doubled. The use of a UV pass filter 24 results in the blue development of PERM. In the absence of such a filter, the PERM development is red.

Figure 3:
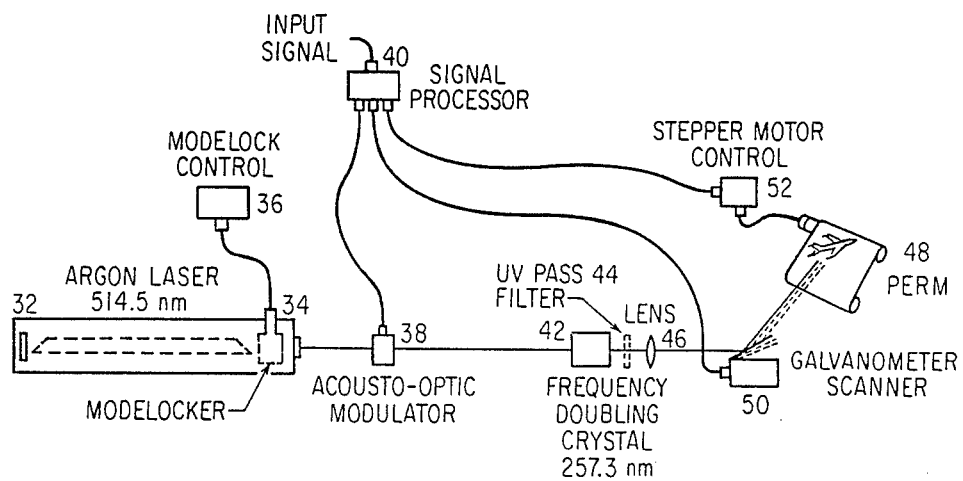
FIG. 3 is a schematic of a UV Laser Image Recorder Apparatus.

A UV Laser Image Recorder apparatus is shown in FIG. 3. The output of an argon laser 32 with a modelocker 34 and modelocker control 36 is adjusted by an acousto-optic modulator 38, which receives signals from a signal processor 40. The output then passes through a frequency doubler 42 and lens 46 and is placed onto PERM 48 by a galvanometer/scanner 50 which is also controlled by signal processor 40. For red development of PERM, UV pass filter 44 is removed. The PERM is adjusted by a stepper motor control 52 which receives signals from processor 40.

The primary light source 32 is an argon laser (Spectra Physics model 165 or equivalent) capable of producing >700 mWatt of 514.5 nm output. Intense fast laser pulses are produced by the use of a modelocker 34 and control 36 (Spectra Physics model 342 AS or equivalent). The laser pulses are selectively dimmed up to 90 percent for imagery development by an acousto-optic modulator 38 (Isomet 1206c-1 or equivalent). The pulses with varying intensity are frequency doubled into the ultraviolet by a second harmonic generating crystal 42 such as betta-bariumborate, $\beta BaB_2O_4$ (Quantum Technology Inc.). The UV laser pulses are then focused by a fused silica lens 46 and rastered with a galvanometer-scanner 50 onto the surface of PERM 48 producing an image from pixels of varying depths of development. The PERM film can be advanced by a scroll controller 52. For red development of PERM, UV pass filter 44 is removed.

Figure 4:
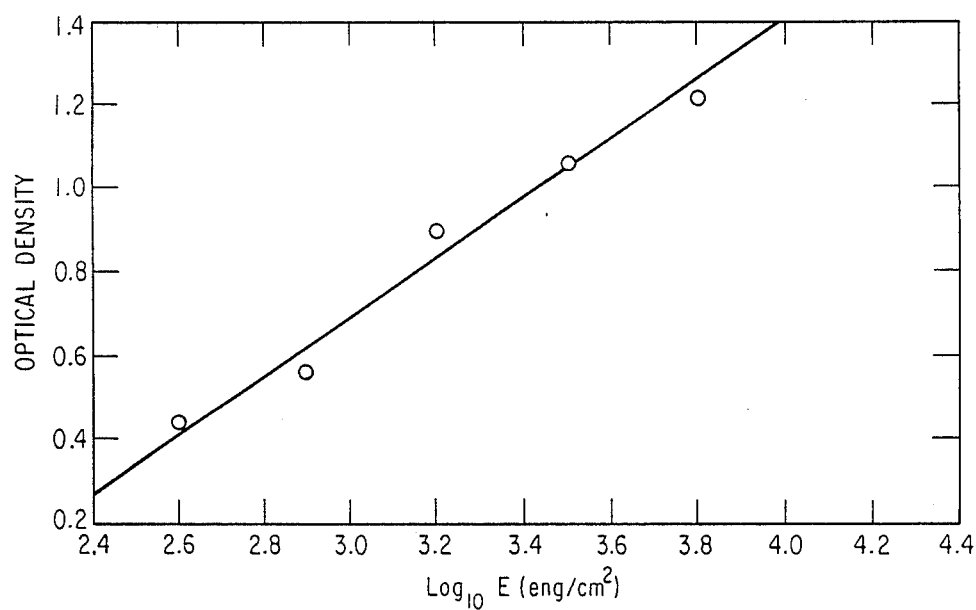
FIG. 4 is a graph plotting optical density (OD) versus the log of UV energy input.

FIG. 4 illustrates the relationship between the induced optical density (OD) on the PERM and the UV energy input. It will be noted that there is a linear relationship between the log of the UV energy input and the OD produced in PERM. We have demonstrated that a 1.76 square millimeter spot was developed to an OD of 1.6 from a 0.5 second exposure using a 50 micro Watt UV laser beam. Using standard focusing techniques, the 1.76 mm$^2$ beam can be reduced to a $7.8 \times 10^{-5}$ mm$^2$ spot (10 $\mu$m) and will produce a $2 \times 10^4$ gain in power density. As power density increases, the development time for PERM decreases. Even with a relatively low power Ar laser (700 mWatt at 514 nm as the primary laser source), a 10$\mu$ diameter pixel can be developed in PERM to an OD of 1.6 in $10^{\times 5}$ sec.

Figure 5:
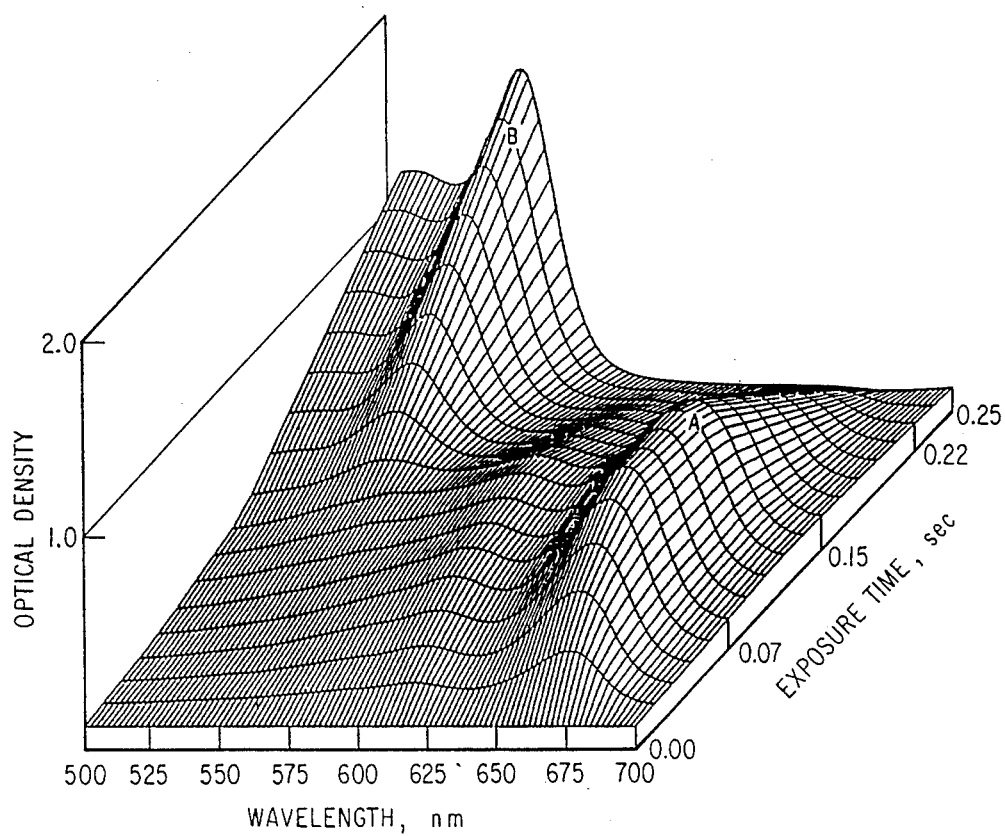
FIG. 5 is a graph plotting PERM absorption spectra versus irradiation time with simultaneous 514 nm and 257 nm laser irradiation.

In another preferred embodiment, applicants determined that blue/red color development in PERM can be achieved by using 257 nm light in conjunction with 514 nm light. This result can be achieved by removing filter 44 as shown in FIG. 3. Upon initial exposure to irradiation, the PERM develops a blue coloration. Further exposure causes the blue to convert to red. The absorptions that produced the observed colors are plotted as a function of irradiation in FIG. 5. Point A on FIG. 5 represents PERM absorption that produces blue coloration while point B represents PERM absorption that produces red coloration.

The UV laser image recorder of the present invention is projected to be capable of 2500 lines/inch with two color capability. In comparison, current laser jet printers available today have a resolution capability of 300 lines/inch. This present system is free of the costly and complex triple stage vacuum and a transparent conductive film layer, requirements that have constrained the e-beam recorder. For example, because there is no charge build-up during UV recording in PERM, the conductive layer can be eliminated and a savings of at least 25 percent in the cost of producing the film can be realized.

We claim:

1. An apparatus for recording an image on a processless electron recording medium (PERM), comprising:
    a. an argon laser capable of generating light pulses at a wavelength of 514.5 nm;
    b. a means of modulating the discrete light pulses to depths of greater than 90 percent;
    c. a means for doubling the frequency of the 514.5 nm primary light into a 257.3 nm wavelength laser beam;
    d. a means for focusing and directing the ultraviolet laser beam onto the surface of the PERM;
    e. a means for coordinating and controlling the rate and intensity at which the ultraviolet light is applied to the PERM;
    f. whereby individual pixels on the PERM are developed by exposure to the ultraviolet laser light.

2. The process of developing an image in a processless electron recording medium (PERM) comprising the steps of:
    (a) generating discrete light pulses from a laser;
    (b) adjusting the duration and intensity of the light pulses so as to form a pulsed beam of ultraviolet light;
    (c) applying the ultraviolet light to the PERM so as to expose the PERM; and
    (d) adjusting the duration of the exposure, so as to develop red or blue color pixels.

* * * * *